United States Patent
Radhakrishnan et al.

(10) Patent No.: US 8,995,669 B1
(45) Date of Patent: Mar. 31, 2015

(54) UPDATING SHARED KEYS

(71) Applicant: Google Inc., Mountain View, CA (US)

(72) Inventors: Sivasankar Radhakrishnan, Sunnyvale, CA (US); Yuchung Cheng, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/148,542

(22) Filed: Jan. 6, 2014

Related U.S. Application Data (63) Continuation of application No. 13/149,708, filed on May 31, 2011, now Pat. No. 8,625,803.

(51) Int. Cl.
*H04L 29/00* (2006.01)
*H04L 29/06* (2006.01)

(52) U.S. Cl.
CPC .................................. *H04L 63/0428* (2013.01)
USPC ........................................................ 380/279

(58) Field of Classification Search
CPC .................................. H04L 9/00; H04L 29/00
See application file for complete search history.

(56) References Cited

U.S. PATENT DOCUMENTS

| | | | |
|---|---|---|---|
| 6,711,679 B1 * | 3/2004 | Guski et al. | 713/156 |
| 2003/0233552 A1 * | 12/2003 | Baldwin et al. | 713/176 |

FOREIGN PATENT DOCUMENTS

| | | |
|---|---|---|
| EP | 1 494 428 | 1/2007 |

OTHER PUBLICATIONS

"Session Persistence Using Cookie Learning on the Cisco Application Control Engine Configuration Example," [online] Dec. 21, 2010 [retrieved on May 20, 2013]. Retrieved from the Internet: <http://docwiki.cisco.com/wiki/Session_Persistence_Using_Cookie_Learning_on_the_Cisco_Application_Control_Engine_Configuration_Example>, 5 pgs.

* cited by examiner

*Primary Examiner* — Brandon Hoffman
*Assistant Examiner* — Michael D Anderson
(74) *Attorney, Agent, or Firm* — Fish & Richardson P.C.

(57) ABSTRACT

Methods, systems, and apparatus, including computer programs encoded on a computer storage medium, for updating shared keys. In one aspect, a method includes generating, at a first server and using a first key associated with a current period of time on the first server, a first piece of information based on a first request received from a first client device; receiving, at a second server, a second request from the first client device, the second request including the generated first piece of information; and validating, at the second server and using the first key, the first piece of information, wherein the validating is performed during the current period of time on the second server and wherein to generate information the second server uses a second key different from the first key.

20 Claims, 4 Drawing Sheets

UPDATING SHARED KEYS

CROSS-REFERENCE TO RELATED APPLICATION

This application is a continuation of U.S. patent application Ser. No. 13/149,708, filed May 31, 2011, the disclosure of which is hereby incorporated by reference in its entirety.

BACKGROUND

This specification relates generally to key sharing in server farms.

Servers in many server farms store a shared key that is used when processing requests received from client devices. The shared key is a piece of information that specifies the functional output of a cryptographic algorithm. For keys that are used in encryption, a key specifies a particular transformation of plaintext into ciphertext.

For example, the servers may use the shared key to generate and validate information associated with received requests, e.g., to encrypt and decrypt HTTP cookies or session identifiers. Generally, a piece of information generated using a particular key can only be validated using the same particular key. The keys stored on each server may be updated periodically, for example, for security reasons.

In many server farms, the current time between servers is not strictly synchronized. For example, for server farms that include servers in several different physical locations and that use the network time protocol ("NTP") to synchronize time between their servers, the current time on two different servers in a server farm can vary by a second or more. Because each request can potentially be routed to a different server in the server farm by a load balancing mechanism, this loose time synchronization between servers can cause unwanted authentication failures. For example, a request received from a client device can be routed to a first server in the server farm. The first server can use a first key to, for example, validate a user's identity by encrypting a cookie that is transmitted back to the client device. When the user submits a subsequent request, the request will include the encrypted cookie so that the user's identity does not need to be verified again. This subsequent request may be routed to a different server by a load balancing mechanism. If the second server is using a second, different key to encrypt and decrypt cookies, e.g., because the time difference between the two servers has caused the first server to update its key before the second server, the second server will be unable to decrypt the cookie and validate the user's identity.

SUMMARY

In general, one aspect of the subject matter described in this specification can be embodied in methods that include the actions of obtaining at a first server a first set of three or more keys, each key in the first set of keys being associated with a different respective period of time, and wherein in order to generate information using a key the first server uses a first key in the first set of keys that is associated with a respective time that coincides with a current time on the first server; obtaining at a different second server a second set of three or more keys including the first key, each key in the second set of keys being associated with a different respective period of time, and wherein in order to generate information using a key the second server uses a second key in the second set of keys that is associated with a respective time period that coincides with a current time on the second server; generating, at the first server and using the first key, a first piece of information based on a first request received from a first client device; receiving, at the second server, a second request from the first client device, the second request including the generated first piece of information; and validating, at the second server and using the first key, the first piece of information, wherein the validating is performed during the current period of time on the second server and wherein the first key is different than the second key. Other embodiments of this aspect include corresponding systems, apparatus, and computer programs, configured to perform the actions of the methods, encoded on computer storage devices.

These and other embodiments can each optionally include one or more of the following features. The method can further include determining, at the second server, that the first piece of information was generated using the first key. The first piece of information can include an identifier corresponding to the first key. The method can further include obtaining, at the first server, a third key; and discarding an oldest key of the first set of keys associated with a respective oldest period of time. The method can further include obtaining, at the second server, the third key; and discarding an oldest key of the second set of keys associated with the respective oldest period of time. The first piece of information can be a cookie.

The method can further include obtaining, at a third server, a third set of three or more keys, each key in the third set of keys being associated with a different respective period of time, and wherein in order to generate information using a key the third server uses a fourth key in the first set of keys that is associated with a respective time that coincides with a current time on the first server; receiving, at the third server, a third request from a second client device; and generating, at the third server and using the fourth key in the third set of three or more keys, a second piece of information associated with the third request for transmission to the second client device. The second set of three or more keys can further include the fourth key. The method can further include receiving, at the second server, a fourth request from the second client device, the fourth request including the second piece of information; and validating, at the second server, during the current period of time, the second piece of information using the fourth key.

Particular embodiments of the subject matter described in this specification can be implemented so as to realize one or more of the following advantages. Shared keys can be updated seamlessly across servers in a server farm without requiring strict synchronization of the clocks between each of the servers. Further, servers can migrate from using one shared key to another without any pauses or disruptions to service. Instances where information is unable to be verified due to loose synchronization of the clocks of the server that encrypted the information and the server that is authenticating the information are eliminated.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
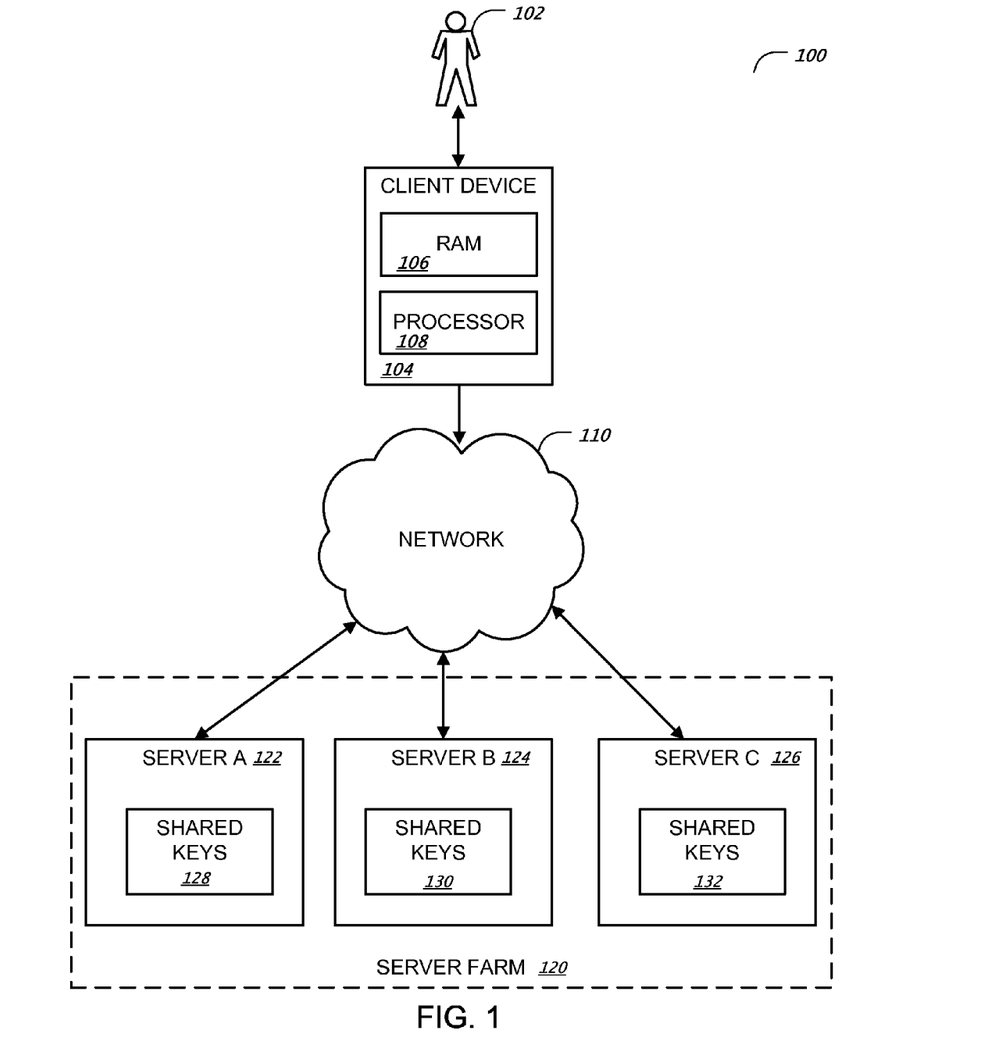
FIG. 1 is block diagram of an example system for validating user requests using shared keys.

FIG. 1 is a block diagram of an example system 100 for processing user requests using shared keys. A user 102 can submit requests to servers 122, 124, and 126 through a client device 104. For example, the client device 104 can be a data processing apparatus coupled to the servers 122, 124, and 126 through a network 110. The network 110 can be, for example, a local area network (LAN) or wide area network (WAN), e.g., the Internet. The client device 104 will generally include a random access memory (RAM) 106 and a processor 108. The client device 104 will also generally include a software application, e.g., a web browser or other communication software, to facilitate the sending and receiving of data over the network.

Each of the servers 122, 124, and 126 can be implemented as one or more data processing apparatus in one or more physical locations, for example. In some implementations, the servers 122, 124, and 126 are included in a server farm 120. The server farm 120 is a collection of multiple servers that processes requests received from client devices to provide a service over network 110. The server farm 120 can contain fewer or more servers than are illustrated in FIG. 1. Because many or all of the servers in server farm 120 perform the same function, requests from client devices received at the server farm 120 can be routed to a particular one of the servers included in the server farm 120 in accordance with a load-balancing algorithm. For example, the load-balancing algorithm can route a received request to the server in the server farm that currently has the lightest load in order to process requests more efficiently.

The servers 122, 124 and 126 each store or otherwise have access to respective sets of shared keys 128, 130, and 132. The shared keys are used by the servers to generate and validate information associated with user requests. For example, the servers can use the keys to encrypt and decrypt pieces of information, e.g., HTTP cookies, session identifiers, and so on. The keys can also be used to, for example, digitally sign or authenticate messages.

When a request is received by one of the servers 122, 124, and 126 from a client device, the server uses the shared key to generate a piece of information, e.g., to encrypt a cookie. The generated piece of information includes an identifier of the shared key used to generate it. The identifier can be, for example, included in a generated cookie in plain text. Other ways of specifying the identifier in the generated piece of information are possible. The piece of information is then returned to the client device, e.g., along with a response to the request. When the client device submits a subsequent request, the generated piece of information is included in the request, and the same shared key that was used to generate the piece of information must be used to validate it. For instance, the generated piece of information can be an encrypted cookie that verifies the identity of the user. When a subsequent request is received from the same user, the request includes the encrypted cookie so that the user does not have to again verify their identity. However, the encrypted cookie can only be decrypted, and the user's identity verified, using the key that was used to encrypt the cookie.

In some implementations, when the subsequent request is received from the client device, the server receiving the request may attempt to validate the piece of information by attempting to regenerate the piece of information, e.g., by generating a new piece of information using one of the shared keys. If the new piece of information matches the piece of information included with the subsequent request, the server validates the request. However, if the shared key used to regenerate the piece of information is not the same as the shared key used to generate the original piece of information, the two pieces of information will not match. For example, in order to validate the IP address of a client device, a first server may generate a piece of information by encrypting the IP address of the client device using a shared key. When a subsequent request is received at a second sever in the server farm that includes the encrypted piece of information, the second server may generate a second piece of information by using a shared key in that server's set of shared keys to encrypt the IP address. If the two pieces of information match, the second server validates the request. If the pieces of information do not match, e.g., because different shared keys were used to generate them, the user of the client device may, for example, be forced to again verify their identity.

At any given time, each of the sets of shared keys 128, 130, and 132 includes three keys, with each key in a set of shared keys being associated with a particular period of time during which the servers in the server farm are to use the key to generate pieces of information. When a new key is generated and added to a set of shared keys, the key in the set of shared keys that corresponds to the oldest time period is discarded. In some implementations, the shared keys are generated by the individual servers using a common seed. Alternatively, the keys can be generated by a common external source and sent to each server. Depending on the implementation, any conventional cryptology algorithm can be used to generate the keys. The lengths of the periods of time corresponding to each key can be specified, e.g., by a system administrator. The specified lengths can be regular, with each key being associated with a period of time of equal duration, or irregular, with some keys being associated with longer periods of time than others.

To assist with the operation of the server farm, the clocks of servers in the server farm, e.g., the servers 122, 124, and 126, are synchronized using conventional techniques, e.g., the network time protocol (NTP). However, conventional techniques used to synchronize time between servers in server farms provide only loose, i.e., not perfect, synchronization between the clocks. Because their clocks are not strictly synchronized, servers 122, 124, and 126 may each read the current time as being a different value. For example, readings of the current time according to the respective clocks of two servers in a server farm using the NTP for synchronization can differ by one second or more.

As described in more detail below with reference to FIG. 2, loose synchronization of clocks between servers 122, 124, and 126 can cause a given server to update the shared key it is using to generate information associated with user requests at a different time than one or more of the others. Therefore, a server in the server farm, e.g., server 122, can receive requests that include pieces of information needing to be validated using a key that is different from the key currently being used by the server to generate information. In some implementations, e.g., when each shared key is associated with a unique identifier, the server can determine whether the key needed to validate the piece of information is included in a set of shared keys, e.g., set of shared keys 128. The server can make this determination using, for example, the identifier of the key used to generate the piece of information that is included in the piece of information. If the needed key is included in the set of shared keys, the server uses the shared key to validate the piece of information. Alternatively, instead of determining whether the needed key is in the set of shared keys, the server can attempt to validate the piece of information using the key that is identified by the identifier included in the piece of information. If the key identified by the identifier is not present or if validating using the identified key fails, the validation fails.

For example, in some implementations, rather than each key being identified with a unique identifier, a new key being added to a particular server's set of shared keys becomes associated with the identifier that was previously associated with the key that is being discarded from that server's set of shared keys. That is, at a given time, a first key in the set of shared keys associated with the earliest time period is associated with a first identifier, a second key associated with the next time period is associated with a second identifier, and a third key associated with the latest time period is associated with a third identifier. When a new key is added to the set of shared keys and the first key associated with the earliest time period is discarded, the new key becomes associated with the first identifier, i.e., the identifier previously associated with the discarded key. Thus, when a request is received that includes a piece of information generated using a shared key having a particular identifier, the server receiving the request may not be able to determine whether the key in the server's set of shared keys associated with the particular identifier is the same as the key used to generate the piece of information. Thus, the server may simply attempt to validate the piece of information using the shared key without determining whether the shared key used to generate the piece of information is in the server's set of shared keys.

In so doing, the problem of unwanted failures to validate information caused by the loose time synchronization between servers can be mitigated and keys can be updated seamlessly even in loosely synchronized server farms. That is, because a particular server can potentially validate information using any key in its set of shared keys, the time between two servers need only be synchronized within a bound that is related to the lengths of the periods of time associated with each key in the set of shared keys.

If the required key is not included in the set of shared keys, the server is not able to validate the piece of information. As described above, the time period that keys are included in a set of shared keys before being replaced by another shared key can be specified based on the implementation. For example, a system administrator desiring to have users verify their identity frequently can specify a shorter time period.

Figure 2:
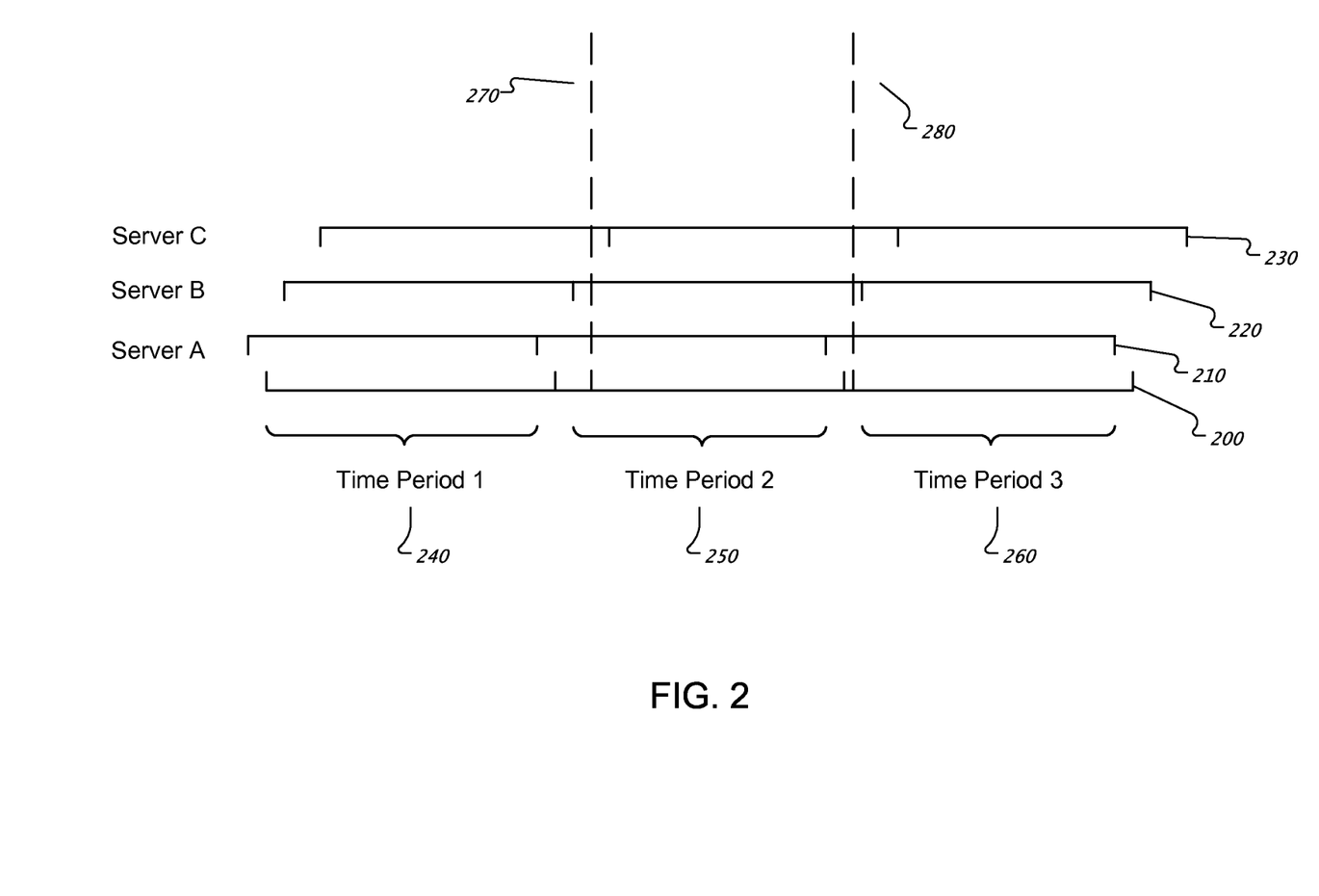
FIG. 2 is a diagram illustrating updating shared keys across multiple servers.

FIG. 2 is a diagram illustrating updating shared keys across multiple servers. As shown in FIG. 2, timeline 200 indicates the time as measured by an external source, e.g., a system administrator or an external source that generates shared keys. Similarly, timeline 210 indicates the current time as read by a clock of a server A within a server farm, timeline 220 indicates the current time as read by a clock of a server B within the server farm, and timeline 230 indicates the current time as read by a server C within the server farm. Because time keeping protocols used to synchronize time between servers in server farms generally result in only loose synchronization between the clocks of individual servers within the farms, timelines 200, 210, 220, and 230 each differ slightly. That is, the current time as read by each of the servers varies, with, for example, the clock of server "A" being ahead of the clock of server "C."

As described above, at any given time, each of the servers in the server farm have access to a set of three keys, with each key being associated with a time period during which it should be used to generate information related to user requests. In the illustrated example, a system administrator or other entity has specified that a first key in the set of keys be used during a first time period 240, a second key be used during a second time period 250, and a third key be used during a third time period 260. While the illustrated time periods are of equal duration, the specified time periods can be of varying lengths, e.g., the key used to generate pieces of information associated with requests does not have to be updated at regular intervals.

Because of the time difference between their clocks, servers A, B, and C each switch to using the second key instead of the first key to generate information at different times. In some implementations, each server switches at the time that the server's clock indicates that time period 1 ends. Alternatively, each server can switch when the server receives an update message from an external source instructing the server to switch to a second key, e.g., when a new key generated from a common external source is received. While the update messages originate from a common source, the keys nonetheless may not arrive at the same time at each of the servers A, B, and C, especially if the servers A, B, and C are in different physical locations. When a time period ends for a given server, each of the servers generates or obtains a new key associated with a future time period and discards the key associated with the oldest time period. Thus, at time 270, servers A and B use the second key to generate information, i.e., because according to the respective clocks of servers A and B, the first time period 240 has ended and the second time period 250 has begun. However, as indicated in timeline 230, according to the clock of server C, the first time period has not yet ended at time 270, and server C is continuing to use the first key to generate information. Thus, server C can potentially receive a request including a piece of information generated using the second key that needs to be validated using the second key before it has begun using the second key to generate information. Similarly, servers A and B can receive requests that include pieces of information needing to be validated using the first key even though they have already begun using the second key to generate information.

At time 280, the clock of server A indicates that time period 2 has ended and time period 3 has begun. Therefore, server A has begun using the third key to generate information. However, according to the clocks of servers B and C, time period 2 has not ended and servers B and C continue to use the second key to generate information. Thus, servers B and C can receive requests needing to be validated using the third key while they are using the second key to generate information. Similarly, server A can receive requests that include pieces of information needing to be validated using the second key even though it has already begun using the third key to generate information.

Figure 3:
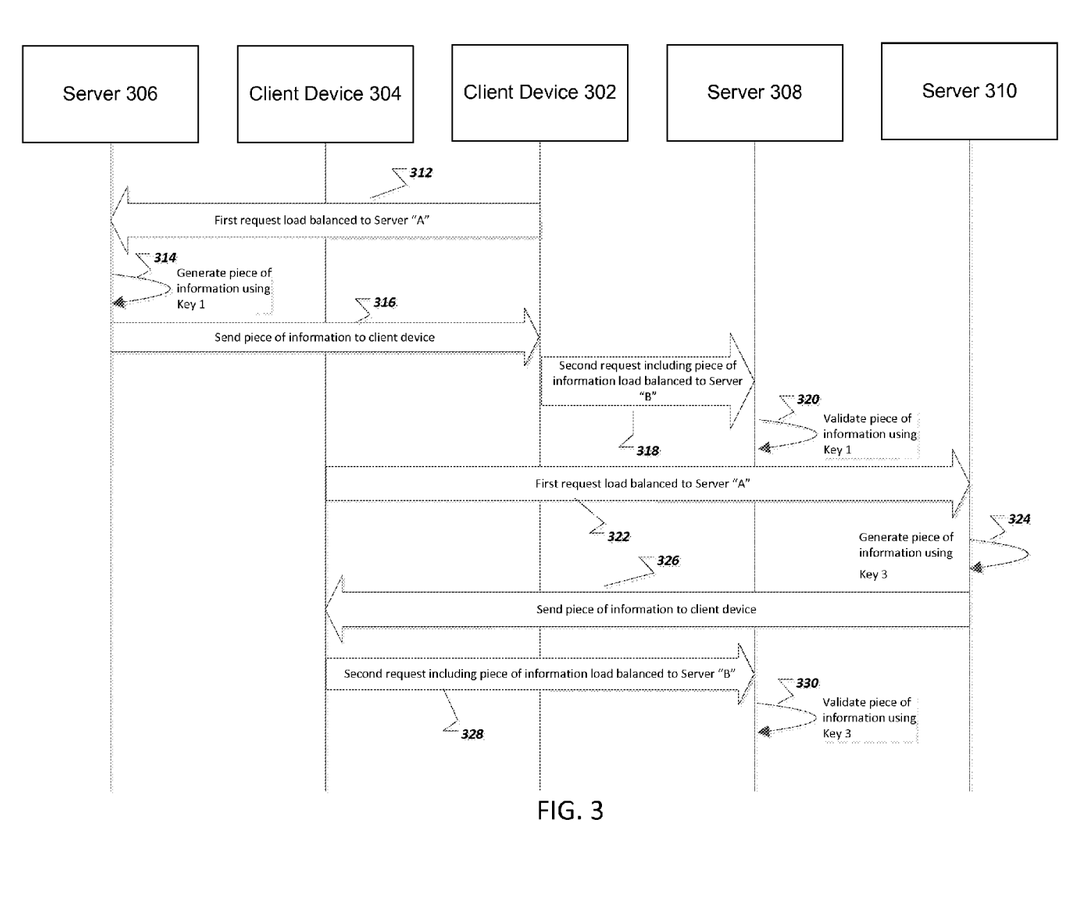
FIG. 3 is a diagram illustrating using a set of three shared keys to process user requests in a server farm.

FIG. 3 is a diagram illustrating using a set of three shared keys to process user requests in a server farm. By way of example, a first request 312 from a client device 302 is load balanced to a server 306 in the server farm. Server 306 generates 314 a piece of information using a first key from a set of three shared keys that is associated with a time period that corresponds to the current time as read by server 306. The generated piece of information can be, for example, a cookie encrypted using the first key, a session identifier or token encrypted using the first key, and so on. The generated piece of information includes an identifier of the key, and server 306 sends 316 the generated piece of information to the client device 302. The generated piece of information can, for example, be transmitted to the client device 302 with a response to the first request.

A subsequent request 318 that includes the piece of information generated by server 306 is load balanced to a different server 308 in the server farm. In some circumstances, even when the subsequent request is received while server 306 is generating information using the first key, the server 308 will be using a different, second key to generate information, e.g., because the clock of server 308 is faster than the clock of server 306 and it has already updated to using the second key. Server 308 validates 320 the piece of information included in the subsequent request using the first key, even though the first key is not the key currently used by server 308 to generate information. For example, server 308 can identify the key used in generating the piece of information based on the identifier included with the piece of information and determine whether the identified key is included in a set of shared keys stored on the server 308. If the identified key is included in the set of shared keys, the server 308 uses that key to validate the piece of information. For example, when the piece of information is a cookie, the server 308 can use the first key to decrypt the cookie or to encrypt a new cookie and determine if the new cookie matches the received cookie.

At a second time in the period during which server 308 is using the second key to generate pieces of information, a request from client device 304 is load balanced 322 to a third, different server 310 in the server farm. Server 310 generates 324 a piece of information using a different, third key, e.g., because server 310 has already updated its key to the key associated with a future time period due to its clock reading a later time than the clock of server 308. Server 310 sends 326 the piece of information generated using the third key to the client device 304.

A subsequent request 328 sent by client device 304 that includes the piece of information generated by server 310 is load balanced to server 308. As described above, server 308 can validate 330 the piece of information using the key that was used to generate it, i.e., the third key, even if the key is not the key currently being used by server 308 to generate information. Thus, server 308 is able to validate pieces of information that were generated both by servers whose respective clocks have caused the servers to update their shared key before server 308 and by servers whose respective clocks have caused the servers to update their shared key after server 308.

For clarity, the above description describes implementations where each server in a server farm stores three keys at any given time. In some implementations, however, each server in the server farm stores more than three keys at any given time. In some of these implementations, each server can validate a received piece of information with any of the stored keys. Alternatively, some of the stored keys can be invalidated for the current time period. For example, although each server stores more than three keys at a given time, each server may only be able to use the key associated with the time period immediately preceding the current time period, the key associated with the current time period, and the key associated with the time period immediately following the current time period to validate a received piece of information.

Figure 4:
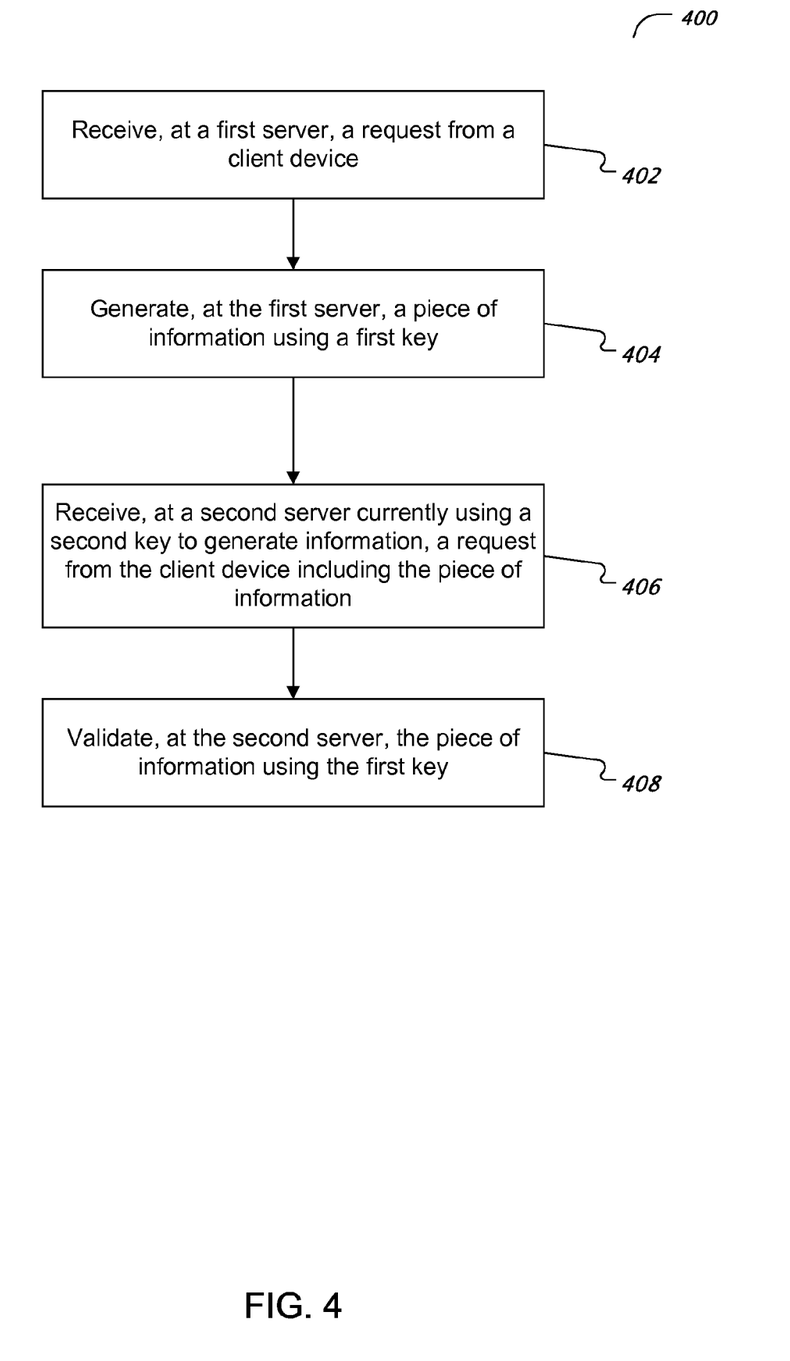
FIG. 4 is a flow diagram of an example technique for using of a set of three or more shared keys to process user requests in a server farm.

FIG. 4 is a flow diagram of an example technique 400 for using of a set of three or more shared keys to process user requests in a server farm. The example technique 400 can be performed by data processing apparatus, e.g., the servers 122, 124 or 126 of FIG. 1.

A first server receives 402 a request from a client device. The first server stores a first set of three or more keys for validating information, with each key in the first set of three or more keys being associated with a respective period of time. The first server generates 404 a piece of information using a first key in the set of three or more keys associated with a period of time corresponding to a current time of the first server.

A second server currently using a second key to generate information receives 406 a request from the client device including the piece of information. The second server validates 408 the piece of information using the first key.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   obtaining, at a first server, a first set of three or more keys, each key in the first set of keys being associated with a different respective time period;
   generating, at the first server and at a first local time read by local clock of the first server that is during a first time period associated with a first key in the first set of keys, a first piece of information based on a first request received from a first client device using the first key;
   receiving, at the first server and at a second local time read by the local clock of the first server that is during the first time period associated with the first key in the first set of keys, a second request from a second client device, the second request including a second piece of information generated using a second key in the first set of keys, the second key being associated with a second time period subsequent to the first time period; and validating, at the first server and at a third local time read by a local clock of the first server that is during the first time period associated with the first key, the second piece of information using the second key associated with the second time period subsequent to the first time period.

2. The method of claim 1, further comprising:
determining, at the first server, that the second piece of information was generated using the second key.

3. The method of claim 2, wherein the second piece of information includes an identifier corresponding to the second key.

4. The method of claim 1, further comprising:
obtaining, at the first server, a third key; and
discarding an oldest key of the first set of keys associated with a respective oldest period of time.

5. The method of claim 1, wherein validating the second piece of information comprises:
decrypting the second piece of information using the second key.

6. The method of claim 1, wherein validating the second piece of information comprises:
generating a new piece of information using the second key; and
comparing the new piece of information to the second piece of information.

7. The method of claim 1, further comprising:
obtaining, at a second server, a second set of three or more keys, each key in the third set of keys being associated with a different respective period of time, the second set of three or more keys including the second key;
receiving a third request from the second client device; and
generating, using the second key, the second piece of information associated with the second request for transmission to the second client device.

8. The method of claim 7, wherein the receiving is performed at a fourth local time during the second time period, wherein the generating is performed at a fifth local time during the second time period, and wherein the fourth and fifth local times are times read by a local clock of the second server.

9. A system comprising one or more data processing apparatus and one or more storage devices that when executed by the one or more data processing apparatus cause the one or more data processing apparatus to perform operations comprising:
obtaining, at a first server, a first set of three or more keys, each key in the first set of keys being associated with a different respective time period;
generating, at the first server and at a first local time read by a local clock of the first server that is during a first time period associated with a first key in the first set of keys, a first piece of information based on a first request received from a first client device using the first key;
receiving, at the first server and at a second local time read by the local clock of the first server that is during the first time period associated with the first key in the first set of keys, a second request from a second client device, the second request including a second piece of information generated using a second key in the first set of keys, the second key being associated with a second time period subsequent to the first time period; and validating, at the first server and at a third local time read by a local clock of the first server that is during the first time period associated with the first key, the second piece of information using the second key associated with the second time period subsequent to the first time period.

10. The system of claim 9, the operations further comprising:
determining, at the first server, that the second piece of information was generated using the second key.

11. The system of claim 10, wherein the second piece of information includes an identifier corresponding to the second key.

12. The system of claim 9, the operations further comprising:
obtaining, at the first server, a third key; and
discarding an oldest key of the first set of keys associated with a respective oldest period of time.

13. The system of claim 9, wherein validating the second piece of information comprises:
decrypting the second piece of information using the second key.

14. The system of claim 9, wherein validating the second piece of information comprises:
generating a new piece of information using the second key; and
comparing the new piece of information to the second piece of information.

15. The system of claim 9, the operations further comprising:
obtaining, at a second server, a second set of three or more keys, each key in the third set of keys being associated with a different respective period of time, the second set of three or more keys including the second key;
receiving a third request from the second client device; and
generating, using the second key, the second piece of information associated with the second request for transmission to the second client device.

16. The system of claim 15, wherein the receiving is performed at a fourth local time during the second time period, wherein the generating is performed at a fifth local time during the second time period, and wherein the fourth and fifth local times are times read by a local clock of the second server.

17. A non-transitory computer storage medium encoded with a computer program, the computer program comprising instructions that when executed by one or more data processing apparatus cause the one or more data processing apparatus to perform operations comprising:
obtaining, at a first server, a first set of three or more keys, each key in the first set of keys being associated with a different respective time period;
generating, at the first server and at a first local time read by a local clock of the first server that is during a first time period associated with a first key in the first set of keys, a first piece of information based on a first request received from a first client device using the first key;
receiving, at the first server and at a second local time read by the local clock of the first server that is during the first time period associated with the first key in the first set of keys, a second request from a second client device, the second request including a second piece of information generated using a second key in the first set of keys, the second key being associated with a second time period subsequent to the first time period; and
validating, at the first server and at a third local time read by a local clock of the first server that is during the first time period associated with the first key, the second piece of information using the second key associated with the second time period subsequent to the first time period.

18. The computer storage medium of claim 17, the operations further comprising:
obtaining, at the first server, a third key; and
discarding an oldest key of the first set of keys associated with a respective oldest period of time.

19. The computer storage medium of claim 17, the operations further comprising:
obtaining, at a second server, a second set of three or more keys, each key in the third set of keys being associated with a different respective period of time, the second set of three or more keys including the second key;
receiving a third request from the second client device; and
generating, using the second key, the second piece of information associated with the second request for transmission to the second client device.

20. The computer storage medium of claim 18, wherein the receiving is performed at a fourth local time during the second time period, wherein the generating is performed at a fifth local time during the second time period, and wherein the fourth and fifth local times are times read by a local clock of the second server.

* * * * *